US012618021B2

(12) United States Patent
Babinski

(10) Patent No.: US 12,618,021 B2
(45) Date of Patent: May 5, 2026

(54) DEGREASING COMPOSITION COMPRISING AN ANIONIC SURFACTANT MIXTURE

(71) Applicant: Wojciech Babinski, Lomza (PL)

(72) Inventor: Wojciech Babinski, Lomza (PL)

( * ) Notice: Subject to any disclaimer, the term of this patent is extended or adjusted under 35 U.S.C. 154(b) by 488 days.

(21) Appl. No.: 18/268,069

(22) PCT Filed: Jun. 21, 2021

(86) PCT No.: PCT/EP2021/066823

§ 371 (c)(1),
(2) Date: Jun. 16, 2023

(87) PCT Pub. No.: WO2022/128173

PCT Pub. Date: Jun. 23, 2022

(65) Prior Publication Data

US 2024/0043772 A1 Feb. 8, 2024

Related U.S. Application Data

(60) Provisional application No. 63/127,226, filed on Dec. 18, 2020.

(51) Int. Cl.

| | |
|---|---|
| ***C11D 1/37*** | (2006.01) |
| ***C11D 1/22*** | (2006.01) |
| ***C11D 1/29*** | (2006.01) |
| ***C11D 3/065*** | (2006.01) |
| ***C11D 3/32*** | (2006.01) |
| ***C11D 17/00*** | (2006.01) |

(52) U.S. Cl.

CPC .................. *C11D 1/22* (2013.01); *C11D 1/29* (2013.01); *C11D 1/37* (2013.01); *C11D 3/065* (2013.01); *C11D 3/323* (2013.01); *C11D 17/0021* (2013.01); *C11D 2111/10* (2024.01)

(58) Field of Classification Search

CPC .. C11D 1/143; C11D 1/22; C11D 1/29; C11D 1/37; C11D 1/50; C11D 3/044; C11D 3/362; C11D 7/3272; C11D 9/14; C11D 17/0021; C11D 17/0043; C11D 2111/20

See application file for complete search history.

(56) References Cited

U.S. PATENT DOCUMENTS

| | | | | |
|---|---|---|---|---|
| 4,018,720 | A * | 4/1977 | Lengyel | C11D 3/06 510/340 |
| 5,929,950 | A | 7/1999 | Matsuda | |
| 2018/0265825 | A1* | 9/2018 | Park | C11D 1/83 |
| 2019/0233772 | A1* | 8/2019 | Lo | C11D 11/0082 |

FOREIGN PATENT DOCUMENTS

| | | | |
|---|---|---|---|
| JP | 10-039280 | A | 2/1998 |
| JP | 2011-197130 | A | 10/2011 |
| JP | 2013-144523 | A | 7/2013 |

* cited by examiner

*Primary Examiner* — Charles I Boyer
(74) *Attorney, Agent, or Firm* — Sughrue Mion, PLLC

(57) ABSTRACT

The invention pertains to degreasing compositions, process for producing and uses thereof. The composition comprises: from about 4% to about 16% by weight of the composition of a first anionic surfactant having HLB value less than 12; from about 1% to about 5% by weight of the composition of a second anionic surfactant having HLB value more than 12; from about 1% to about 4% by weight of the composition of a weak acid; from about 2% to about 6% by weight of the composition of urea; from about 1% to about 5% by weight of the composition of trisodium phosphate; about 1% to about 4% of the composition, of an inorganic base; and from about 60% by weight to about 90% by weight of the composition of water.

28 Claims, 2 Drawing Sheets

DEGREASING COMPOSITION COMPRISING AN ANIONIC SURFACTANT MIXTURE

CROSS REFERENCE TO RELATED APPLICATIONS

This application is a National Stage of International Application No. PCT/EP2021/066823 filed Jun. 21, 2021, claiming priority based on U.S. Provisional Application No. 63/127,226 filed Dec. 18, 2020.

FIELD OF THE INVENTION

The present invention pertains to the field of cleaning/degreasing compositions, in particular to the compositions for cleaning oil stains from contaminated substrates, surfaces or areas and/or remediation of oil/hydrocarbon spills from soil, and separation of oil from particulate solids.

BACKGROUND OF THE INVENTION

Several oil degreasing formulations capable of removing oil stains from various surfaces are known. Typically, oil removal compositions contain halogens and so-called "alkaline builders". Other compositions include a mixture of detergents and water used to remove oil stains.

Still others have developed machines and procedures that may be useful for removing oil stains from concrete surfaces, including grinding clay-sand mixtures to concrete surfaces. However, such machines and procedures can be difficult to use and costly. Another way to reduce contaminants is through sorbents that bind crude oil.

Non-aqueous-based cleaning fluids are also used to clean unwanted oil from substrates, for example, to remove grease spots from clothing or other fabrics. However, these cleaning fluids tend to dilute and spread the oil, as opposed to fully removing it from the substrate. Furthermore, many of these non-aqueous-based cleaning fluids are toxic.

Effective methods of cleaning spilled oil and fuel from sand, gravel, and soil are also needed. In addition, drilling operations often employ oil-based drilling fluids which contaminate the drill cuttings. The disposal of drilling fluid-contaminated drill cuttings is strictly regulated, and methods of cleaning the cuttings for disposal are also needed.

Conventionally a base oil washes or detergent washes have been used to clean contaminated soil and/or drill cuttings. A base oil washes and detergent washes comprise contacting the contaminated soil or drill cuttings with a base oil, or an aqueous surfactant solution, respectively. The base oil and detergent wash processes are typically capable of reducing the oil content to only about 5 to about 20 percent.

Methods of biological removal of crude oil have been employed, which, on the one hand, are expensive to use, and on the other hand—irretrievably destroy spilled crude oil. Industrial detergents comprising blends of a surfactant such as sodium salt of alkyl aryl sulfonic acid and a solvent such as naphtha have also been used.

It is well known that only a portion of the oil can be recovered from oil-bearing subterranean formations/reservoirs as a result of the natural energy of the formations/reservoirs. According to scientists, up to 60% of oil is left in oil reservoirs and cannot be recovered with existing technologies. Several secondary recovery techniques may be used to force more oil out of the reservoir, the simplest method of which is by direct replacement with another medium, usually water or a gas such as $CO_2$. $CO_2$ is expensive to capture, process & distribute, as well as very highly corrosive, and is therefore not attractive from the point of capital efficiency, i.e.,—in terms of investment & life cycle cost). Another technology that may be used is hydrocarbon gas (however availability of miscible hydrocarbon gas is not sufficient). Current technologies therefore provide marginal incremental oil recovery from original oil in reservoirs.

Thus, there is a need to develop degreasing/cleaning compositions that would be economical, environmentally friendly, and effective for removing oil stains from various substrates/surfaces, cleaning particulate solids such as soil, drill cuttings, etc., and/or recovering oil, such as petroleum hydrocarbons, from soil, and which through their biodegradability, minimize the environmental impact, and do not destroy the hydrocarbon chain, allowing the majority of the spill to be recovered in an environmentally safe manner. The demand for this type of composition grows noticeably with the economic development of the world, increasing oil production and potential environmental disasters.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide degreasing compositions, process for producing and uses thereof.

In accordance with an aspect of the present invention, there is provided a degreasing composition, which comprises: from about 4% to about 16% by weight of the composition of a first anionic surfactant having HLB value less than 12; from about 1% to about 5% by weight of the composition of a second anionic surfactant having HLB value more than 12; from about 1% to about 4% by weight of the composition of a weak acid; from about 2% to about 6% by weight of the composition of urea; from about 1% to about 5% by weight of the composition of trisodium phosphate; about 1% to about 4% of the composition, of an inorganic base; and from about 60% by weight to about 90% by weight of the composition of water.

In accordance with an aspect of the present invention, there is provided a process for preparing the compositions of the present invention. The process comprises: a) mixing the weak acid with a first portion of total amount of water in the composition, at a temperature about 20-50° C. until the weak acid is dissolved; b) gradually adding the first anionic surfactant to the mixture; c) gradually adding the second anionic surfactant to the mixture; d) allowing the mixture to stand after the addition of the surfactants; e) adding a second portion by weight of total amount of water in the composition to the mixture, the water having a temperature about 20-50° C.; f) adding the trisodium phosphate and urea to the mixture; g) adding the inorganic base (as a 10-15% solution of water); and h) allowing the mixture to stand at room temperature to allow air bubbles to escape.

In accordance with an aspect of the present invention, there is provided a method of cleaning an oil-stained surface utilizing the compositions of the present invention. The method comprises: applying the degreasing composition as defined in any one of claims 1 to 10 on the contaminated surface to form a composition-oil mixture; and removing the degreasing composition-oil mixture from the surface, and optionally separating the composition from the removed oil.

In accordance with an aspect of the present invention, there is provided a method of cleaning particulate solids contaminated with oil utilizing the compositions of the present invention. The method comprises mixing the degreasing composition as defined in any one of claims 1 to 10 with the contaminated solids to form a composition-oil mixture; separating the degreasing composition-oil mixture from the solids, and separating the degreasing composition from the composition-oil mixture separated from the soil.

BRIEF DESCRIPTION OF THE FIGURES

The invention will now be described by way of an exemplary embodiment with reference to the accompanying simplified, diagrammatic, not-to-scale drawings. In the drawings.

DETAILED DESCRIPTION OF THE INVENTION

Figure 1:
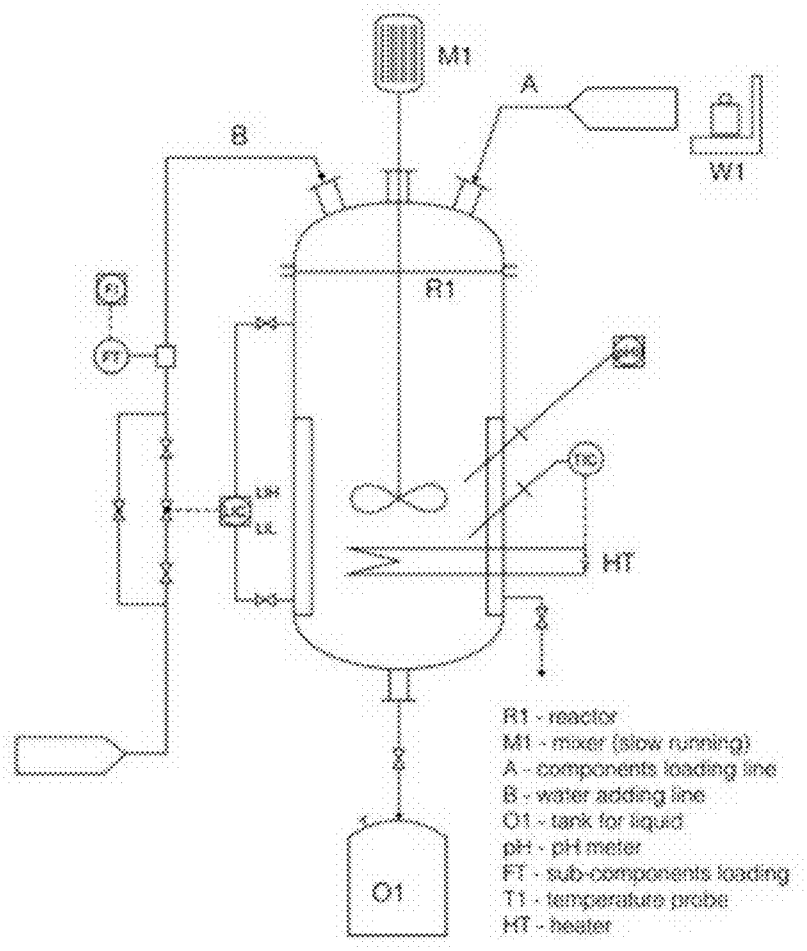
FIG. 1 is a schematic depiction of an apparatus and system for producing the composition in accordance with an embodiment of the present invention.

Unless defined otherwise, all technical and scientific terms used herein have the same meaning as commonly understood by one of ordinary skill in the art to which this invention belongs.

As used herein, the term "oil" refers to crude oil, engine oil, hydraulic oil, mineral oil, transmission fluid, power steering fluid, brake fluid, gasoline, kerosene, diesel, fuel oil, crankcase oil, grease, lithium fat, white grease, cutting oil, vegetable fat, vegetable oil, lard, margarine, cooking oil, animal excrement, horse manure stains, and the like.

As used herein the term "HLB value" refers to the hydrophilic-lipophilic balance of a surfactant molecule, which is the balance of the size and strength of the hydrophilic and lipophilic moieties of the surfactant, and a measure of the degree to which a surfactant can be hydrophilic or lipophilic.

As used herein, the term "hydrophilic" refers to a molecule or moiety attracted to water molecules and tends to be dissolved by water.

As used herein, the term "lipophilic" refers to a molecule or moiety that dissolves in lipids, fats, oils and non-polar solvents.

As used herein, the term "about" refers to approximately a +/−10% variation from a given value. It is to be understood that such a variation is always included in any given value provided herein, whether or not it is specifically referred to.

The present invention provides novel aqueous degreasing compositions, which are suitable for cleaning of oil stained substrates and surfaces and separation of oils from solids, and more particularly, for the separation of oils from particulate solids such as soil/gravel/sand/ash, drill cuttings, etc.

The cleaning/degreasing compositions of the present invention comprise about 4% to about 16% by weight of the composition of a first anionic surfactant having HLB value less than 12; about 1% to about 5% by weight of the composition of a second anionic surfactant having HLB value more than 12; about 1% to about 4% by weight of the composition of a weak acid; about 2% to about 6% by weight the composition of urea; about 1% to about 5% by weight the composition of trisodium phosphate; about 1% to about 4% of an inorganic base; and about 60% to about 90% by weight the composition of water.

In some embodiments, the first anionic surfactant is a linear $C_{9-14}$ alkylbenzene sulfonic acid, or a mixture of two or more $C_{9-14}$ alkylbenzene sulfonic acids, or alkali metal salt there. The alkylbenzene sulfonic acid has the chemical formula:

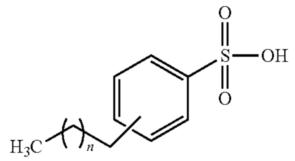

n = 7-12

In some embodiments, the first anionic surfactant is dodecylbenzene sulfonic acid. In some embodiments, the first anionic surfactant is 4-dodecylbenzene sulfonic acid. In some embodiments, the first surfactant is 2-dodecylbenzene sulfonic acid.

In some embodiments, the second anionic surfactant is an alkali metal salt of $C_{10-14}$ alkyl-polyether-sulfonic acid having 2-8 ether units. In some embodiments, the alkali metal is sodium or potassium.

In some embodiments, the second anionic surfactant is sodium lauryl ether sulfate having 2-6 ether units, and having the chemical formula:

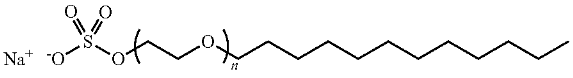

n = 2-6

In some embodiments, the second anionic surfactant is sodium laureth-3-sulfate or sodium laureth-2-sulfate.

In some embodiments, the weak acid is boric acid.

The inorganic base is used to regulate acidity of a composition. A property selected amount of the acidity regulating agent allows to obtain a neutral pH of the emulsion (preferably pH 7.5 (*/−) 1.

In some embodiments, the inorganic base can be NaOH, KOH, or $NH_4OH$. In some embodiments, the inorganic base is NaOH.

In an embodiment, the composition of the present invention comprises:

- about 1.5%-2.5% by weight of sodium laureth sulfate;
- about 1.5%-2.5% by weight of boric acid;
- about 7%-10% by weight of dodecycylobenzene sulfonic acid;
- about 2%-3.5% by weight of urea;
- about 1.5%-2.5% by weight of trisodium phosphate;
- about 1.5%-2.5% by weight of sodium hydroxide; and balance water.

In an embodiment, the composition of the present invention comprises:

- about 1.8%-2.2% by weight of sodium laureth sulfate;
- about 1.8%-2.2% by weight of boric acid;
- about 8%-9% by weight of dodecycylobenzene sulfonic acid;
- about 3% by weight of urea;
- about 1.8%-2.2% by weight of trisodium phosphate;

about 1.8%-2.2% by weight of sodium hydroxide; and balance water.

In some embodiments, the composition has HLB value about 10.

In some embodiments, the composition is in the form of an emulsion, and/or comprises microemulsions.

The cleaning/degreasing compositions of the present invention are based on two property selected detergents, i.e. surfactants, (wherein one may be emulsifying oil in water, the other may be emulsifying-water in oil,) mixed together in a specific manner result in formation of an emulsion or microemulsion, which provides for the separation of the oil and water layers.

It is understood that the surfactant to be used or mixtures of surfactants as well as their levels are selected depending on the nature and level of the active ingredient so as to form the microemulsions of the present invention. Typically, the microemulsions make up from about 0.01% to 40% by weight of the total surfactant emulsion or mixtures thereof, preferably from 0.05% to 25% and most preferably from 0.1% to 12%.

Suitable surfactants for use in the composition include any anionic surfactant known to the specialists in the field capable of forming a microemulsion as defined herein, containing an inorganic acid or an active ingredient thereof.

The compositions of the present invention can further comprise non-ionic, cationic, amphoteric and/or zwitterionic surfactants.

The compositions of the present invention can be used as a cleaner/degreaser to remove oil stains from soiled substrates/surfaces and/or to clean hydrocarbon spills (especially-petroleum) from contaminated surfaces or areas/soil and other solid particulates. The presented compositions and formulations are particularly useful for removing hydrocarbon stains, including but not limited to petroleum-based, hydrocarbon-based products, from porous surfaces including but not limited to concrete, wood, stone, masonry, fabric, synthetic and other oil-absorbing substrates, in particular, treatment of land contaminated by an oil spill.

Synthesis of the cleaning formulation depends on selecting the conditions and the appropriate electrolyte shield so that there is no release of an aqueous solution and/or decomposition of any of the components from the mixture, which loses the characteristics of a classic solution (dissolved chemical molecules) and turns into a colloid (sol) in the last phase of the reaction. This colloid-sol is metastable. The period of its durability [suitability for use] is determined to be 3-5 years. Factors such as strong electrolytes, calcium and iron ions cause sol decomposition and loss of specific emulsifying properties of the formulation.

When such a metastable "solution" is added to the environment in order to bind petroleum products, it breaks down and one component migrates to the hydrophobic phase. The other ingredients according to the recipe enable the formation of a colloid and they stabilize it. A well-made formulation is durable, as mentioned, for several dozen months and biodegradable.

In another aspect, the present invention provides a process for preparing a composition as defined above. The process of the present invention comprises the steps of: a) mixing the weak acid with a first portion of total amount of water in the composition, at a temperature about 20-50° C. until the weak acid is dissolved; b) gradually adding the first anionic surfactant to the mixture; c) gradually adding the second anionic surfactant to the mixture; d) allowing the mixture to stand after the addition of the surfactants; e) adding a second portion by weight of total amount of water in the composition to the mixture, the water having a temperature about 20-50° C., f) adding the trisodium phosphate and urea to the mixture; g) adding the inorganic base (as a 10-15% solution of water); and h) allowing the mixture to stand at room temperature to allow air bubbles to escape.

The order in which the individual substances are added may be changed as desired.

In some embodiments, the first portion of water used in step a) is about 25 to 45% of the total amount of the water. In some embodiments, the second portion of water used in step e) is about 25 to 45% of the total amount of the water.

In some embodiments, step a) comprises adding the weak acid to the water provided in a reactor. In some embodiments, the reactor is provided with a mixer to mix the reaction mixture when desired.

In some embodiments, in step b) the reaction mixture is mixed while the first anionic surfactant is being added followed by mixing for up to about 30 minutes. In some embodiments, in step c) the mixture is mixed while the second anionic surfactant is being added followed by mixing for up to about 30 minutes.

In some embodiments, in step d) the mixture is allowed to stand for up to 60 minutes, and in step d) the mixture is allowed to stand for up to 24 hr.

The compositions of the present invention can enable the cleaning/degreasing of oil stained surfaces by contacting such stained surfaces with a specific formulation designed to remove targeted oil stains in a simple, easy, and safe manner. The stains that can be removed include, but are not limited to, crude oil, engine oil, hydraulic oil, mineral oil, transmission fluid, power steering fluid, brake fluid, gasoline, kerosene, diesel, fuel oil, crankcase oil, grease, lithium fat, white grease, cutting oil, vegetable fat, vegetable oil, lard, margarine, cooking oil, animal excrement and horse manure stains.

The compositions of the present invention can therefore be used in well drilling operations, in environmental cleanup of oil spills, and in the reclamation of valuable oil from oily sludges.

The compositions of the present invention can also be used in a method for recovering petroleum from subterranean formations by injecting an aqueous solution of the composition or an emulsion (microemulsions) of the composition in water into the subterranean formation.

In some embodiments, the compositions of the present invention can be used in enhancing oil recovery from original oil the subterranean formation/reservoir, preferably in the form of an emulsion or microemulsion in water.

In some embodiments, the compositions of the present invention can be used as an agent for extinguishing burning oil, preferably in the form of an emulsion or microemulsion in water.

The compositions can be used in concentrated form or a dilute solution in water, having the composition to water weight or volume ratio of 1:10 to 1:1000, depending upon the desired cleaning process.

Water suitable for the preparation and/or for use with the compositions of the present invention can by any type of water, such as sea water, salted water, drinking water, fresh/sweet water, distilled water, etc.

The present invention also includes a method of removing contaminants caused by spills of petroleum (and other hydrocarbons) into the ground, contamination of surfaces, tanks, pipelines, etc. through subsequent steps of (1) delivering the formulation to the contaminated site, (2) binding the oil products to the formulation, (3) forming a stable emulsion, (4) separating the emulsion (combination of petroleum/hydrocarbons with formulation) from the contaminated surface, and then (5) separating the petroleum from the formulation.

In some embodiments, the compositions of the present inventions are used in a method of cleaning an oil stained surface, comprising the steps of: applying a degreasing composition of the present invention on the contaminated surface to form a composition-oil mixture; removing the degreasing composition-oil mixture from the surface, and optionally separating the composition from the removed oil.

In some embodiments, the degreasing composition is applied in its concentrated form. In some embodiments, the degreasing composition is applied as a dilute solution in water, having the composition to water weight or volume ratio of 1:10 to 1:1000.

In some embodiments, the degreasing composition-oil mixture can be removed by rinsing and/or wiping or scrubbing with a cloth or brush, or can be removed mechanically under pressure.

In some embodiments, the degreasing composition is applied by spraying, preferably under pressure.

In some embodiments, the method involves cleaning/removing the stains of crude oil, engine oil, hydraulic oil, mineral oil, transmission fluid, power steering fluid, brake fluid, gasoline, kerosene, diesel, fuel oil, crankcase oil, grease, lithium fat, white grease, cutting oil, vegetable fat, vegetable oil, lard, margarine, cooking oil, animal excrement and/or horse manure stains.

In some embodiments, contaminated surface includes concrete, wood, stone, masonry, fabric, synthetic and oil-absorbing substrates, oil reservoir, tanks, pipelines, and or particulate solids such as soil, drill cuttings, gravel, sand, ash, etc.

In some embodiments, the compositions of the present inventions are used in a method of cleaning particulate solids contaminated with oil, wherein the method comprises: mixing the degreasing composition of the present invention with the contaminated solids to form a composition-oil mixture; separating the degreasing composition-oil mixture from the soil, and separating the degreasing composition from the composition-oil mixture separated from the soil.

In some embodiments, the contaminated solid is soil contaminated with oil spills.

To gain a better understanding of the invention described herein, the following examples are set forth with reference to the accompanying drawings, which are not drawn to scale, and the illustrated components are not necessarily drawn proportionately to one another.

It will be understood that these examples are intended to describe illustrative embodiments of the invention and are not intended to limit the scope of the invention in any way.

EXAMPLES

Production Process

An exemplary composition was prepared following the process described below.

Equipment

The basic device used for the production the exemplary composition is the RI reactor as shown in FIG. 1, with a capacity of at least 1.5 $m^3$ made of acid-resistant steel. The reactor is equipped with a propeller stirrer with adjustable speeds. So-called baffles to limit the formation of a funnel should be constructed inside the reactor. Electric heaters are placed in the lower part of the reactor, with power enough to heat up about 1.5 $m^3$ of water to a temperature of 70° C. within half an hour.

With respect to FIG. 1:

R1 reactor
M1 mixer
W1 weighter
A components loading line
B water adding line
O1 liquid tank
pH pH meter
FT sub-component loading line
TI temperature probe
HT heater The Process for Producing 1500 Liters of Concentrated Liquid:

1. to the reactor, added 600 liters of water at a temperature of 30° C. (±5° C.)
2. added 30 kg of boric acid to water, and mixed for 15-30 minutes, to bring it to dissolution,
3. added 125-130 liters of alkylbenzene sulfonate acid (ABS) (still mixing), and mixed for 30 minutes,
4. added 30 liters of sodium laureth sulfate (SLES), still mixing the composition for about 30 minutes, turned off the mixer—allowed the reaction mixture to stand (calm down the mixture) for about 60 minutes,
5. added 500 liters of water (with temperature of 30° C.), turned on mixing, added 30 kg of trisodium phosphate ($Na_3PO_4$), mixed the reaction mixture, added 50 kg of urea—still mixing, mixed for about 30 minutes (bringing it to full dissolution),
6. prepared the acidity regulator—around 300 liters of NaOH (10%),
7. regulated pH of the obtained preparation to the level pH of 7.8-9.1 by adding solution of NaOH (10%) in about 250-300 liters,
8. allowing the reaction mixture to stand for 24 hours in the reactor so that the air bubbles contained in it escape, at the end—the resulting preparation was poured into PEHD tank.

The result of above mention process of production would be concentrated liquid, which has to be diluted in proportions from of 1:10 to 1:1000 (weight or volume ratio of liquid to water) depending upon the desired use.

Depending on the proportion of mixing with water, the emulsion can be used for:

- cleaning of surfaces contaminated with hydrocarbons;
- cleaning of fat stains and similar substances in households;
- washing of industrial equipment—tanks, cisterns, oil pipelines, tankers, etc.;
- washing away hydrocarbon contamination—petroleum derivatives;
- washing off spilled oil from the ground, cleaning up contamination in the sense of ecology, liquidation of "production pits" accompanying oil production wells;
- washing (regeneration) of exhausted oil wells;
- cleaning the soil of contamination caused by oil spills;
- enhanced oil recovery from the original oil in place;
- extinguishing burning oil; and
- separating original oil from oily sand or oily sludge.

The composition was used to clean a contaminated surface by:

1. applying the formulation to the contaminated surface, without diluting,
2. waiting for about 5-10 minutes,
3. working mechanically under pressure or by scrubbing with a cloth—a brush,
4. rinsing with water.

Figure 2:
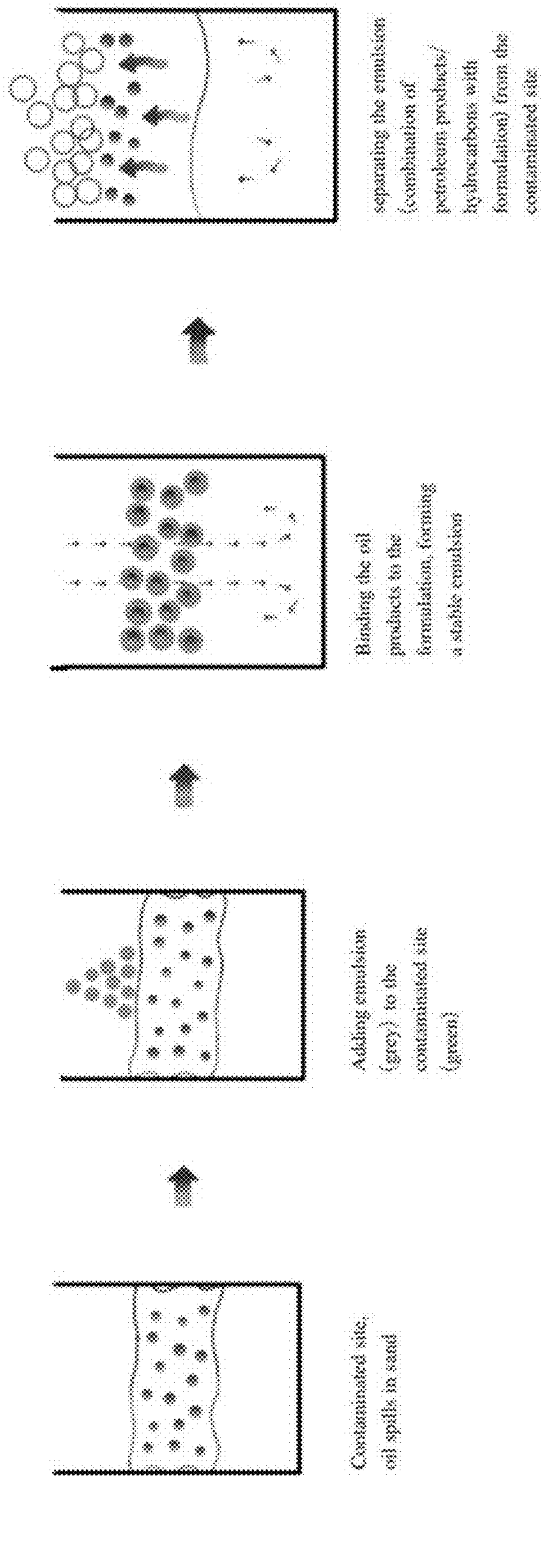
FIG. 2 is a schematic depiction of a method of applying the composition on a contaminated surface and separating hydrocarbons from surface, in accordance with an embodiment of the present invention.

FIG. 2 is a schematic depiction of a method of applying the composition on a contaminated surface and separating hydrocarbons from surface, wherein when an emulsion (microemulsions) of the composition in water is added to the contaminated site having oil spills in sand, the oil products bind to the formulation, and form a stable emulsion comprising petroleum products/hydrocarbons-composition combination, which gets separated from the contaminated site.

The above exemplary composition is characterized by a high penetration capacity, including hard-to-reach places, which makes it highly effective in removing all kinds of contaminants, including oil contamination. This formulation leaves no streaks on the surface, and its different concentrations in water ensure its versatility and a wide range of applications. The agent according to the invention has a friendly, non-irritating odor which does not pose any toxic risk to the user. Thanks to the organic content of soap substances, it is a low-foaming agent, eliminating the need for additional intensive rinsing of the washed surface. The surface cleaning and degreasing agent according to the invention is characterized by high biodegradability, in the order of even 98.8%.

It is believed, during operation when the liquid microemulsion composition of the present invention is applied to an oil-stained surface, the liquid soaks into the pores of the surface. The composition combines with the oil particles and brings them to the surface where they are collected into a tank and separated from the water (by a separation process).

The above description relates only to the preferred executions. Modification of the invention will occur to the specialists in this field and those who make or use the invention. Therefore, it should be understood that the executions shown in the figures and described above are for illustrative purposes only and are not intended to limit the scope of the invention, which is defined in the following claims, interpreted in accordance with the principles of patent law, including the doctrine of equivalents.

What is claimed is:

1. A degreasing composition comprising:

A) from about 4% to about 16% by weight of the composition of a first anionic surfactant having an HLB value less than 12;

B) from about 1% to about 5% by weight of the composition of a second anionic surfactant having an HLB value more than 12;

C) from about 1% to about 4% by weight of the composition of a weak acid;

D) from about 2% to about 6% by weight of the composition of urea;

E) from about 1% to about 5% by weight of the composition of trisodium phosphate;

F) from about 1% to about 4% by weight of the composition of an inorganic base; and G) from about 60% to about 90% by weight of the composition of water.

2. The composition of claim 1, wherein the first anionic surfactant is a linear C9-14 alkylbenzene sulfonic acid or a mixture of two or more C9-14 alkylbenzene sulfonic acids.

3. The composition of claim 2, wherein the first surfactant is dodecylbenzene sulfonic acid.

4. The composition of claim 1, wherein the second anionic surfactant is an alkali metal salt of C10-14 alkyl-polyether-sulfonic acid having 2-8 ether units.

5. The composition of claim 1, wherein the second anionic surfactant is sodium lauryl ether sulfate having 2-6 ether units, and having the chemical formula:

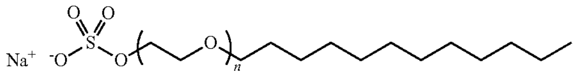

n = 2-6

6. The composition of claim 5, wherein the second anionic surfactant is sodium laureth-3-sulfate or sodium laureth-2-sulfate.

7. The composition of claim 1, wherein the inorganic base is NaOH.

8. The composition of claim 1, wherein the weak acid is boric acid.

9. The composition of claim 1, comprising:

A) about 8% by weight of dodecylbenzene sulfonic acid;

B) about 2% by weight of sodium laureth sulfate;

C) about 2% by weight of boric acid;

D) about 3% by weight of urea;

E) about 2% by weight of trisodium phosphate;

F) about 2% by weight of sodium hydroxide; and

G) about 80% by weight of water.

10. The composition of claim 1, wherein the composition has an HLB value of about 10.

11. The composition of claim 1, wherein the composition is in the form of an emulsion and/or a microemulsion.

12. A process for preparing the composition of claim 1, the process comprising the steps of:

a) mixing the weak acid with a first portion of the total amount of water in the composition at a temperature of about 20-50° C. until the weak acid is dissolved;

b) gradually adding the first anionic surfactant to the mixture;

c) gradually adding the second anionic surfactant to the mixture;

d) allowing the mixture to stand after the addition of the surfactants;

e) adding a second portion by weight of the total amount of water in the composition to the mixture, the water having a temperature of about 20-50° C.;

f) adding the trisodium phosphate and urea to the mixture;

g) adding the inorganic base (as a 10-15% solution in water); and h) allowing the mixture to stand at room temperature to allow air bubbles to escape.

13. The process of claim 12, wherein the first portion of water is about 25 to 45% of the total amount of the water.

14. The process of claim 12, wherein the second portion of water is about 25 to 45% of the total amount of the water.

15. The process of claim 12, wherein step a) comprises adding the weak acid to the water provided in a reactor.

16. The process of claim 12, wherein step b) comprises mixing while the first anionic surfactant is being added followed by additional mixing for up to about 30 minutes.

17. The process of claim 12, wherein step c) comprises mixing while the second anionic surfactant is being added followed by additional mixing for up to about 30 minutes.

18. The process of claim 12, wherein in step d) the mixture is allowed to stand for up to 60 minutes, and in step h) the mixture is allowed to stand for up to 24 hr.

19. A method of preparing a degreasing composition, the method comprising:

adding, into a chemical reactor, about 600 liters of water having a temperature of about 25-35° C.;

mixing, into the chemical reactor, about 30 kg of boric acid for about 15 minutes to about 30 minutes, until the boric acid dissolves;

mixing, into the chemical reactor, from about 125 liters to about 130 liters of alkylbenzene sulfonic acid for about 30 minutes;

mixing, into the chemical reactor, about 30 liters of sodium laureth sulfate for about 30 minutes;

letting the reaction mixture stand still for about 60 minutes;

mixing, into the chemical reactor, about 500 liters of water having a temperature of about 30° C., about 30 kg of trisodium phosphate and about 50 kg of urea;

adding, into the chemical reactor, from about 250 liters to about 300 liters of an about 10% solution of sodium hydroxide;

allowing the reaction mixture to stand still for about 24 hours to allow air to escape contents of the chemical reactor.

20. A method of cleaning an oil-stained surface, the method comprising:

applying the degreasing composition as defined in claim 1 on the contaminated surface to form a composition-oil mixture; and removing the degreasing composition-oil mixture from the surface, and optionally separating the composition from the removed oil.

21. The method of claim 20, wherein the method comprises spraying the degreasing composition, preferably under pressure.

22. The method of claim 21, wherein the degreasing composition is applied as a dilute solution in water, having the composition to water weight ratio of 1:10 to 1:1000.

23. The method of claim 20, wherein the oil stains are selected from the group consisting of crude oil, engine oil, hydraulic oil, mineral oil, transmission fluid, power steering fluid, brake fluid, gasoline, kerosene, diesel, fuel oil, crankcase oil, grease, lithium fat, white grease, cutting oil, vegetable fat, vegetable oil, lard, margarine, cooking oil, animal excrement and/or horse manure stains.

24. The method of claim 20, wherein the contaminated surface includes concrete, wood, stone, masonry, fabric, synthetic and oil-absorbing substrates, oil reservoir, tanks, pipelines, and/or particulate solids.

25. A method of cleaning particulate solids contaminated with oil, the method comprising:

mixing the degreasing composition as defined in claim 1 with the contaminated solids to form a composition-oil mixture;

separating the degreasing composition-oil mixture from the contaminated solids, and separating the degreasing composition from the composition-oil mixture separated from the contaminated solids.

26. The method of claim 25, wherein the contaminated solid is soil contaminated with oil spills or drill cuttings contaminated with drilling fluid.

27. The composition of claim 1, wherein the composition is in the form of an emulsion or microemulsion in water, and the composition is for use in enhancing oil recovery from original oil in place.

28. The composition of claim 1, wherein the composition is in the form of an emulsion or microemulsion in water, and the composition is for use as an agent for extinguishing burning oil.

* * * * *